United States Patent
Gitt et al.

(10) Patent No.: US 12,459,345 B2
(45) Date of Patent: Nov. 4, 2025

(54) HYBRID DRIVE SYSTEM

(71) Applicant: MERCEDES-BENZ GROUP AG, Stuttgart (DE)

(72) Inventors: Carsten Gitt, Stuttgart (DE); Tobias Haerter, Stuttgart (DE); Peter Hahn, Stuttgart (DE); Andreas Kolb, Wernau (DE); Klaus Riedl, Tübingen (DE); Tobias Schilder, Ludwigsburg (DE); Jonathan Zeibig, Aalen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 191 days.

(21) Appl. No.: 18/281,052

(22) PCT Filed: Jan. 28, 2022

(86) PCT No.: PCT/EP2022/052033
§ 371 (c)(1),
(2) Date: Sep. 8, 2023

(87) PCT Pub. No.: WO2022/189065
PCT Pub. Date: Sep. 15, 2022

(65) Prior Publication Data
US 2024/0308324 A1    Sep. 19, 2024

(30) Foreign Application Priority Data
Mar. 11, 2021 (DE) .................... 10 2021 001 315.8

(51) Int. Cl.
*B60K 6/365* (2007.10)
*B60K 6/387* (2007.10)
*B60K 6/547* (2007.10)

(52) U.S. Cl.
CPC .............. *B60K 6/365* (2013.01); *B60K 6/387* (2013.01); *B60K 6/547* (2013.01)

(58) Field of Classification Search
CPC ........ B60K 6/365; B60K 6/387; B60K 6/547; B60K 2006/4816; B60K 6/48; F16H 2200/2023
See application file for complete search history.

(56) References Cited

U.S. PATENT DOCUMENTS

| 9,254,737 B2 | 2/2016 | Kaltenbach et al. |
| 2009/0209381 A1 | 8/2009 | Ai et al. |

(Continued)

FOREIGN PATENT DOCUMENTS

| DE | 102006050598 A1 | 6/2007 |
| DE | 102013221461 A1 | 4/2015 |

(Continued)

OTHER PUBLICATIONS

Office Action dated Oct. 1, 2024 in related/corresponding JP Application No. 2023-555571.

(Continued)

*Primary Examiner* — Tisha D Lewis
(74) *Attorney, Agent, or Firm* — PATENT PORTFOLIO BUILDERS PLLC

(57) ABSTRACT

A hybrid drive system includes a first and second spur gear component transmission that drift via a countershaft. A planetary gear set is arranged coaxially to a crankshaft of the internal combustion engine. A first shaft is couplable with the crankshaft. A rotor of the electric motor is couplable with a second shaft. A first input shaft of the first spur gear component transmission is connected, fixed against rotation, with a third shaft. A second input shaft of the second spur gear component transmission is connected, fixed against rotation, with a fourth shaft of the planetary gear set. The first and the second spur gear component transmission each have exactly one spur gear pairing. An interlock switch element for the rotationally fixed connection of two of the shafts of the planetary gear set is arranged between the two (Continued)

spur gear pairings in an axial direction, seen along the input shafts.

12 Claims, 2 Drawing Sheets

(56) References Cited

U.S. PATENT DOCUMENTS

| | | | |
|---|---|---|---|
| 2010/0261565 A1 | 10/2010 | Ai et al. | |
| 2013/0102430 A1 | 4/2013 | He et al. | |
| 2014/0221153 A1* | 8/2014 | Xue | B60K 6/547 |
| | | | 477/5 |

FOREIGN PATENT DOCUMENTS

| | | | | |
|---|---|---|---|---|
| DE | 102017006082 A1 | 1/2019 | | |
| DE | 102019003186 A1 * | 3/2020 | ............ | B60K 6/547 |
| EP | 2447571 A1 * | 5/2012 | ............... | B60K 6/36 |
| EP | 3106336 A1 | 12/2016 | | |
| JP | 2005155891 A | 6/2005 | | |
| JP | 2005329841 A | 12/2005 | | |
| JP | 2017171258 A | 9/2017 | | |

OTHER PUBLICATIONS

International Search Report and Written Opinion mailed May 6, 2022 in related/corresponding International Application No. PCT/EP2022/052033.

Office Action created Jan. 13, 2022 in related/corresponding DE Application No. 10 2021 001 315.8.

* cited by examiner

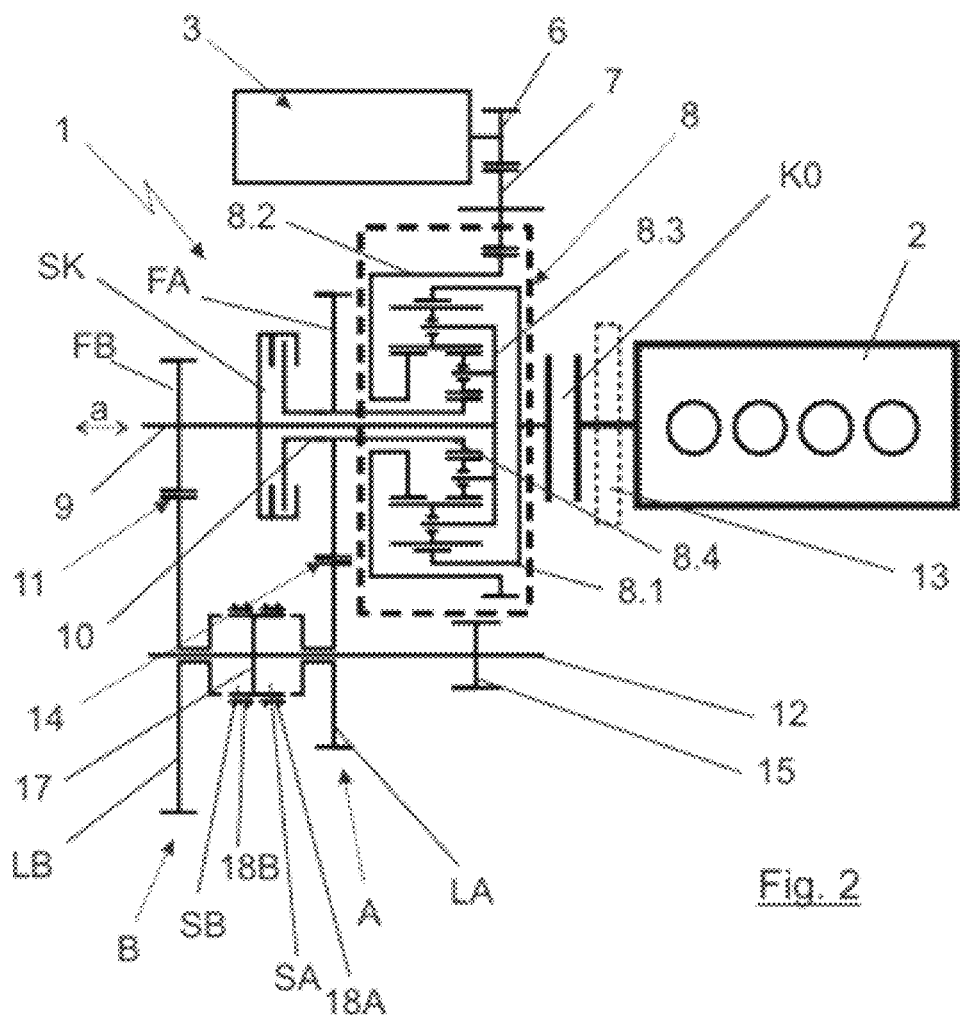

HYBRID DRIVE SYSTEM

BACKGROUND AND SUMMARY OF THE INVENTION

Exemplary embodiments of the invention relate to a hybrid drive system having an internal combustion engine and an electric motor.

DE 10 2013 221 461 A1 shows a hybrid drive system having an internal combustion engine, an electric motor, and a gearbox that has a four-shaft planetary gear set and two spur gear component transmissions.

For example, DE 10 2017 006 082 A1 of the applicant describes a generic hybrid drive system having an internal combustion engine and an electric motor. Here, a four-shaft planetary gear set is used, via which the electric motor and the internal combustion engine are coupled into the gearbox of the hybrid drive system.

Further, in this context, reference can be made to US 2013/0102430 A1. It also shows a hybrid drive system having a four-shaft planetary gear set and two spur gear component transmissions, between which the output to a differential gear is implemented centrally via a countershaft.

The construction in the initially mentioned prior art has a high degree of complexity in implementing many functions, which is indeed simpler in the second construction mentioned in the prior art, but necessitates a lot of installation space, in particular in the axial direction, so in the direction of the main transmission axis or of the input shafts of both spur gear component transmissions.

Exemplary embodiments of the present invention are directed to a simple and above all very compact construction in the axial direction, with a large number of useful gear functions.

The hybrid drive system according to the invention serves, in particular, as a vehicle drive. It comprises an internal combustion engine and one or at least one electric motor, as well as a four-shaft planetary gear set. Here, the four-shaft planetary gear set is arranged coaxially to a crankshaft of the internal combustion engine. In addition, two mechanical tracks are provided via a first spur gear component transmission and a second spur gear component transmission, in order to emit drive energy either via one track, the other track or both tracks. The first shaft of the planetary gear set is coupled with the crankshaft of the internal combustion engine for this, or preferably can be coupled via a separating clutch as well as via a torsional vibration damper, if necessary. A rotor of the electric motor is coupled or can be coupled with a second shaft of the planetary gear set. The rotor of the electric motor can also directly form this second shaft of the planetary gear set, for example in that the rotor of the electric motor forms the ring gear of the planetary gear set or is directly connected with this. A first input shaft of the first spur gear component transmission and a second input shaft of the second spur gear component transmission then form the third and the fourth shaft of the planetary gear set or are preferably connected with these in a manner fixed against rotation.

It is now the case according to the invention that the first and the second spur gear component transmissions each have exactly one spur gear pairing, in order to therefore realize a simple and compact construction. Both spur gear pairings of each of the first spur gear component transmission, on one hand, and of the second spur gear component transmission, on the other hand, are arranged relative to each other such that, seen in an axial direction along both input shafts of the respective spur gear component transmissions, an interlock switch element for interlocking two of the shafts of the planetary gear set is arranged between the two spur gear pairings. The planetary gear set therefore includes an interlock switch element, by means of which two of its shafts can correspondingly be connected, in order to interlock the planetary gear set so that this rotates as a unit, without a movement of its components relative to each other. This interlock switch element is arranged axially between the two spur gear pairings and therefore axially between the two spur gear component transmissions. An extremely compact construction in the axial direction is therefore possible. By means of the application of the four-shaft planetary gear set of the internal combustion engine and the electric motor in the described arrangement, a plurality of functions can nevertheless be easily and efficiently implemented with the hybrid drive system according to the invention.

The four mentioned shafts of the four-shaft planetary gear set are arranged coaxially to one another. The axes of rotation of the four mentioned shafts therefore coincide with an axis of rotation of the four-shaft planetary gear set. The term "axial" used in the following relates to the axis of rotation of the four-shaft planetary gear set. This axis of rotation of the four-shaft planetary gear set is here considered a main axis of rotation. The term "axial direction" that is also used in the following relates to the direction of the main axis of rotation. Since the four-shaft planetary gear set is arranged coaxially to the crankshaft of the internal combustion engine, the axis of rotation of the crankshaft of the internal combustion engine also coincides with the main axis of rotation.

Both mentioned spur gear component transmissions and the four-shaft planetary gear set form a gearbox together. The gearbox is arranged relative to a torsional movement power originating from the internal combustion engine between the internal combustion engine and an axle gear, also referred to as a differential gear. Furthermore, the gearbox is arranged relative to a torsional movement power originating from the electric motor between the electric motor and the axle gear.

"In a manner fixed against rotation" in the sense of the invention is defined in such a way that "a connection or coupling in a manner fixed against rotation," should be understood to mean that there are two elements mounted in a rotatable manner, that these two elements are arranged coaxially to each other, and are connected with each other such that they rotate with the same angular velocity. In the context of this invention, a connection of two elements in a manner fixed against rotation is then also discussed, if, for example, a vibration damper or torsional damper is arranged between the two elements, which, in particular when there are abrupt changes in rotational speed, allows little rotation between the two elements.

An especially advantageous arrangement of parts of the hybrid drive system arises if, relative to one of the torsional movement power of the internal combustion engine originating from the internal combustion engine, the four-shaft planetary gear set and both mentioned spur gear component transmissions are arranged one after the other in the mentioned order. In a corresponding operation of the hybrid drive system, torsional moments originating from the internal combustion engine are therefore initially introduced into the four-shaft planetary gear set and from there into one of the two mentioned spur gear component transmissions. Relative to the spur gear component transmission, the axle gear is advantageously arranged after the two mentioned spur gear component transmissions.

Relative to one of the torsional moments originating from the electric motor, the four-shaft planetary gear set is advantageously arranged after the electric motor and in front of the two spur gear component transmissions.

The interlock switch element itself can, for example, be formed as a friction clutch in order to therefore also enable an interlocking of the elements when there are different rotational speeds of the corresponding shafts of the planetary gear set. According to an especially favorable and advantageous embodiment, it can, however, be provided that the interlock switch element is formed as a positive-fit coupling. Such a positive-fit coupling, which in particular dispenses with any kind of synchronization element, can be especially simply and compactly constructed. It works largely without wear and by means of the application of the electric motor, which is coupled or can be coupled with the second shaft of the four-shaft planetary gear set, allows an adaptation of the rotational speeds if necessary, in order to therefore allow a comfortable and reliable switching, even with the coupling configured to be a positive-fit as an interlock switch element.

According to an unusually favorable development of the hybrid drive device according to the invention, it can also be provided that exactly one countershaft is provided with an output gear that is connected to it in a manner fixed against rotation, wherein this output gear is arranged overlapping the planetary gear set. The one countershaft allows a very compact construction of the gearbox perpendicular to the axial direction. The arrangement of the output gear connected with it in a manner fixed against rotation, which is therefore formed as a fixed gear axially overlapping the planetary gear set allows, differently to in the prior art, a very compact construction in the axial direction. The differential gear can thereby move very close to the internal combustion engine, which advantageously helps the compact construction and the ideal exploitation of the installation space typically available in a vehicle. An installation transverse to the direction of travel is therefore easily possible.

The expression that two elements are arranged "axially overlapping" means, in the context of the present invention, that both elements are each arranged at least partially in the same axial region or axial section. The axial region is defined here by a coordinate interval on a reference axis, here the main axis of rotation, wherein coordinates of the two other spatial dimensions are arbitrary.

The internal combustion engine or its crankshaft can here, according to a further advantageous embodiment of the hybrid drive system according to the invention, be able to be connected with the first shaft of the planetary gear set via a separating clutch in a manner fixed against rotation. A dual-mass flygear for damping or eradicating torsional vibrations can be provided here, supplementarily or also compactly integrated with the separating clutch. Alternative structures of torsional vibration dampers are also conceivable. The separating clutch itself allows a purely electrical operation of the hybrid drive system by means of separating the gearbox or planetary gear set from the internal combustion engine, which correspondingly increases the possibilities for increasing the functionality of the hybrid drive system according to the invention. The separating clutch itself can be formed as a positive fit or also as a frictional connection. It can in particular also be implemented in a positive-fit manner without synchronization, in order to therefore be able to shape it especially simply and compactly during construction.

Here, the electric motor or at least one rotor gear of the rotor of the electric motor are arranged overlapping the planetary gear set, as seen in the axial direction. This arrangement of the electric motor, which is preferably arranged axially parallel to the input axes of the two spur gear component transmissions and the crankshaft, also allows a construction that is very compact in the axial direction. With the rotor gear, what is meant is a gear connected with the rotor in a manner fixed against rotation, via which torsional moments that originate from the electric motor can be transmitted to the four-shaft planetary gear set.

According to an advantageous development, the connection of the electric motor can occur via further gear elements like a spur gear component transmission, a belt drive, a chain drive or similar.

Alternatively to this, the electric motor can, however, also be arranged coaxially, for example coaxially to the planetary gear set, wherein the ring gear of the planetary gear set then preferably forms the second shaft, which is coupled with the rotor gear of the electric motor or directly forms a part of the rotor of the electric motor, with such a coaxial arrangement of the same.

An exceptionally favorable development of the hybrid drive system according to the invention can now be provided in that a switching element for the first spur gear component transmission is arranged coaxially to the countershaft and axially between the spur gear pairings. Such an arrangement of a switching element for the first spur gear component transmission that is coaxial to the countershaft therefore uses a fixed gear in the region of the input shaft in the first spur gear pairing and consequently an idle gear on the at least one, according to the embodiment described above exactly one, countershaft. In principle, such a switching element could be arranged coaxially to this in every axial position on the countershaft. Especially preferably, it is located between the two spur gear pairings.

Here, what is to be understood by coaxial in the sense of the present invention is a rotatably mounted element that is coaxial to another rotatably mounted element, like, for example, a shaft, so that the axes of rotation of the two elements are each coincident or aligned. Further, it is the case according to the invention that what is to be understood by a gear pairing or spur gear pairing is a number of two gear gears meshing with each other or spur gears, which have parallel axes of rotation and are arranged relative to a plane which is perpendicular to these axes of rotation, in a common plane which is referred to as a gear set plane.

According to an extremely favorable development, this also applies for a second switching element for the second spur gear component transmission, which is preferably also arranged coaxially to the countershaft and in particular axially between the spur gear pairings. This construction therefore creates a construction with fixed gears in the region of the respective input shafts, which enclose the interlock switch element in the axial direction between the fixed gears, and the corresponding idle gears on the preferably exactly one countershaft in both spur gear component transmissions. Both switching elements are thereby preferably arranged axially between the spur gear pairings, therefore use the same installation space as the interlock switch element in the axial direction, so that no additional installation space is needed in the axial direction.

Both switching elements can have a common synchronization body according to a very favorable development of these ideas, in order to therefore realize a construction that is as simple as possible and is, in turn, as compact as possible in the axial direction. According to a very advantageous development of these variants of the hybrid drive system according to the invention, a common sliding sleeve can preferably be provided here, in order to therefore also reduce the expense regarding the components and the actuator system again.

An advantageous embodiment of the hybrid drive system according to the invention now provides that the first shaft of the four-shaft planetary gear set is the first sun, the second shaft is the ring gear, the third shaft is the second sun and the fourth shaft is the bridge, so here the double bridge. Such an embodiment therefore allows the corresponding use of the ring gear as a second shaft for connecting the electric motor, so that both a connection via a gear element and via a spur gear component transmission, a belt drive or chain drive or similar is conceivable. The axis of rotation of a rotor of the electric motor then therefore lies axially parallel to the axis of rotation of the crankshaft of the internal combustion engine. Or it alternatively allows a corresponding integration of the planetary gear set into the electric motor, so that its rotor forms the ring gear of the four-shaft planetary gear set, and the electric motor is arranged coaxially to the main axis of rotation of the gearbox. The driving of the internal combustion engine then occurs via the first sun and the first shaft, the second sun and the bridge correspondingly drift away, therefore form the input shafts of the two spur gear component transmissions, which can in particular be connected with each other in a manner fixed against rotation, by the interlock switch element.

According to an alternative, however not less advantageous, embodiment, the first shaft of the planetary gear set can also be the ring gear, the second shaft can be the second sun, the third shaft can be the bridge and the fourth shaft can be the first sun. In this configuration too, an advantageous operation of the hybrid drive device according to the invention with the four-shaft planetary gear set is possible.

Lastly, the four-shaft planetary gear set is constructed in both variants such that the first shaft represents the sum shaft in relation to the third and the fourth shaft, as soon as they are both switched to be active with the spur gear component transmissions connected with third and the fourth shaft. Their corresponding switching elements are therefore closed and the electric motor does not provide any significant torsional moment. The third shaft of the planetary gear set that is connected in a manner fixed against rotation with the first spur gear component transmission represents the sum shaft in relation to the second shaft and the first shaft, as soon as a gear step is switched to be active in the first spur gear component transmission, and the switching element of the other spur gear component transmission is open, wherein the electric motor makes a significant torsional moment available.

Further advantageous embodiments of the hybrid drive system according to the invention also result from the two exemplary embodiments, which are described in more detail in the following, with reference to the figures.

BRIEF DESCRIPTION OF THE DRAWING FIGURES

Here:

FIG. 2 shows a section from an alternative embodiment of the hybrid drive system according to the invention; and FIG. 3 a switching table for explaining the possible states of the hybrid drive system according to the invention in FIG. 1 and FIG. 2.

DETAILED DESCRIPTION

Figure 1:
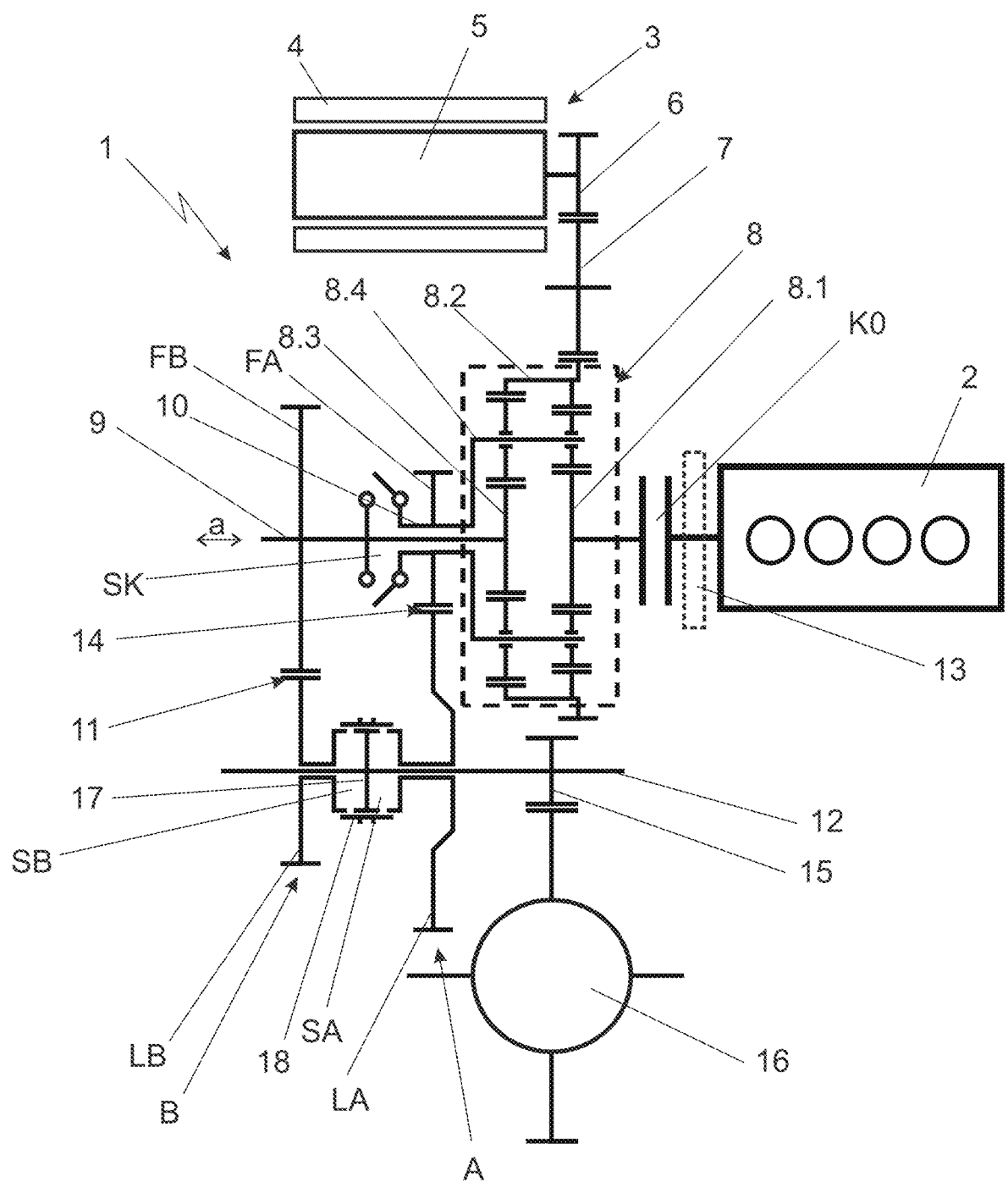
FIG. 1 shows a schematic representation of a first possible embodiment of the hybrid drive system according to the invention.

In the representation of FIG. 1, a hybrid drive system 1 can be seen, which comprises an internal combustion engine 2, as well as an electric motor 3 having a stator 4 and a rotor 5. The rotor 5 is connected with a rotor gear 6 in a manner fixed against rotation, which rotor gear 6 is connected to a four-shaft planetary gear set 8 as a gear element via an intermediate gear 7. Here, the four-shaft planetary gear set 8 comprises a first shaft or a first element 8.1, which is here formed by the first sun. Here, a second element 8.2 is coupled with the intermediate gear 7 and is formed by a ring gear of the planetary gear set 8. As well as both of these shafts 8.1 and 8.2, a third shaft or a third element 8.3 of the planetary gear set 8 is formed by a second sun and is connected with a first input shaft 9 of a first spur gear component transmission B in a manner fixed against rotation. A bridge or double bridge as a fourth shaft or fourth element 8.4 of the planetary gear set 8 is connected in a manner fixed against rotation with a second input shaft 10 of a second spur gear component transmission A.

The first shaft or the first element 8.1 of the planetary gear set 8 can be connected with a crankshaft (not indicated) of the internal combustion engine 2 via a separating clutch K0 and an optional torsional vibration damper 13. When the separating clutch K0 is closed, which can preferably be designed as a positive-fit coupling without synchronization, the internal combustion engine 2 or its crankshaft can therefore couple with the first shaft 8.1 as necessary.

A first fixed gear FB that is arranged coaxially and in a manner fixed against rotation to this is driven via the first input shaft 9, which drives a first idle gear LB, which form a spur wheel pairing 11 together. Here, this spur wheel pairing 11 is the only spur wheel pairing of the first spur gear component transmission B, the idle gear LB of which is arranged coaxially to a countershaft 12 and can be connected with this in a manner fixed against rotation via a switching element SB, if necessary. The second spur gear component transmission A comprises a fixed gear FA on the second input shaft 10 that is connected with the third shaft 8.3 of the planetary gear set 8, which is implemented coaxially to the first input shaft 9 as a hollow shaft formed around this. An idle gear LA then completes a spur wheel pairing 14 and therefore the second spur gear component transmission A, which only comprises this one spur wheel pairing 14. Via a switching element SA, this idle gear LA can also be connected with the countershaft 12 in a manner fixed against rotation, if necessary.

The countershaft 12 supports, for its part, an output gear 15 that overlaps the planetary gear set 8, arranged in a section in the axial direction a, which always refers to the axis of rotation of the countershaft of the internal combustion engine and therefore to the main axis of rotation of the spur gear component transmission A, B. This meshes with a differential gear 16 schematically indicated here, which is also referred to as an axle gear, via which a driven axle of a vehicle equipped with the hybrid drive system 1 is driven.

Both switching elements SA, SB are summarized into a combined special switching element in the exemplary embodiment represented here, which could also be referred to as SAB. This comprises a common synchronization body 17 as well as a common sliding sleeve 18 in the exemplary embodiment shown here. As well as the embodiment of the switching elements as friction switching elements that is also conceivable in principle, this variant is ideal with an embodiment of the switching elements SA and SB as a combined switching element with a common sliding sleeve 18 and a positive-fit switch via a single actuator. Regarding the arrangement, it can preferably be arranged between the two spur wheel pairings 11, 14. It can have different switching positions. The first idle gear LB can therefore, on one hand, be connected with the countershaft 12 and therefore with the output via the output gear 15, and also the other idle gear LA. Both idle gears can also be connected with the countershaft 12. Optionally, a further switching position is also conceivable, wherein the sliding sleeve 18 is moved such that it is still only connected with one of the idle gears, for example the idle gear KA is connected so that no connection with the countershaft 12 exists and therefore there is a neutral gear wherein the output is decoupled.

Two of the elements of the planetary gear set 8, for example the third shaft 8.3 and the fourth shaft 8.4 or the input shaft 9 that is connected with it in a manner fixed against rotation or second input shaft 10 in the exemplary embodiment shown here, can be connected with each other via an interlock switch element SK, which here is, in turn, preferably formed as a positive-fit switching element without synchronization. With the corresponding rotational speed of the elements, a relative movement between the elements of the planetary gear set can be implemented by means of a connection of the bridge, as the fourth element 8.4, with the second sun, as the third element 8.3. The planetary gear set 8 then rotates as a unit, which is why the switching element SK is commonly referred to as an interlock switch element.

An alternative construction of the hybrid drive system 1 is represented based on FIG. 2, which shows a section of the hybrid drive system 1, in contrast to the representation in FIG. 1, without the differential gear 16. Here, all relevant elements have the same reference numerals as before and are only explained again regarding the differences. The planetary gear set 8 is formed here such that the first shaft 8.1 of the planetary gear set 8 that can be connected with the internal combustion engine 2 via the separating clutch K0 is formed by the ring gear. The second shaft 8.2 connected with the electric motor 3 is formed by the second sun. Here, the third shaft 8.3 is the bridge or double bridge, which, as the third element, is in turn connected with the first input shaft 9 of the first spur gear component transmission B. The remaining element of the planetary gear set 8 is the first sun, which, as the fourth shaft 8.4, is correspondingly connected with the second input shaft 10 of the second spur gear component transmission B.

Here, both spur gear component transmissions A, B are substantially as shown in the representation of FIG. 1. Both switching elements SB and SA for connecting the idle gears LB and LA with the countershaft 12 are, in this case, equipped with the same synchronization body 17 but separated sliding sleeves 18A, 18B and actuators, so that either the switching element SA or the switching element SB or both can be activated when separated from each other. In the switching variants of both shift sleeves 18A, 18B represented here, the neutral gear is inserted and the drive is decoupled form the output gear 15 or the countershaft 12. As well as these differences, the interlock switch element SK is also formed as a friction coupling in the exemplary embodiment represented here. All three differences can therefore each also be individually combined with the corresponding embodiment variants form the exemplary embodiment of FIG. 1, so, for example, the combined switching element SAB with the configuration of the planetary gear set 8 represented here, or the embodiment of the interlock switch element SK as a friction coupling with the configuration of the planetary gear set 8 from FIG. 1, etc.

Both described variations of the exemplary embodiment of the hybrid drive system 1 now enable different states described in the following with the help of the table in FIG. 3. Each closed coupling or a closed switching element or the corresponding state recorded in the table is here represented by a dot.

A first combined state, wherein the hybrid drive system 1 can be acted on both by the internal combustion engine and also the electric motor, is referred to as EVT1. The torsional moments or rotational speeds of the internal combustion engine 2 and the electric motor 3 are here transmitted to the planetary gear set 8, the switching element SA is closed and the switching element SB is simultaneously opened. This state can, for example, occur for starting up a vehicle with the hybrid drive system 1 in the hybrid mode. Both the internal combustion engine 2 and also the electric motor 3 are involved here. By torsional moment from the internal combustion engine 2 and an originally generator-driven operation of the electric motor 3, the torsional moment that leads to the drive can be increasingly expanded, depending on controlling the electric motor 3, in that the generator-driven performance is correspondingly reduced to the electric motor 3. An electrodynamic start-up can hereby be implemented. In the further operation, the electric motor can then also be operated in a motorized manner. As well as this start-up of a vehicle with the hybrid drive system 1, the first EVT mode EVT1 also serves, among other things, for active transmission adjustment as well as a rotational speed synchronization inside the switching element SB, in particular when alternating from the first to the second gear, which is described more below. In the first gear, the planetary gear set 8 is then correspondingly interlocked, in that the interlock switch element SK is closed, either wherein the equal rotational speed of the elements involved is synchronized by the electric motor 3 via a positive-fit coupling element or, as suggested in the representation of FIG. 2, via the frictionally connected coupling element, which here forms the interlock switch element.

With the aid of the synchronization in the region of the switching element SB that has already been discussed above, the interlock switch element SK is opened on one hand when changing from the first to the second gear, and the switching element SB is closed in addition to the switching element SA or with a common sliding sleeve 18, this is moved in the corresponding position.

In order to then come into the third gear from the second gear, the switching element SA is opened or the common sliding sleeve 18 is correspondingly moved and the interlock switch element SK is simultaneously closed again, so that both input shafts 9, 10 and the planetary gear set 8 are correspondingly interlocked.

In the second EVT mode, if the interlock switch element SK is open, the open switching element SA and closed switching element SB, the rotational speeds and torsional moments of the internal combustion engine 2 and the electric motor 3 are then correspondingly transmitted to the planetary gear set 8. This second EVT mode EVT2 in particular serves here as an overdrive mode and provides a corresponding "long" transmission. It also serves as the active transmission adjustment and can be used for a rotational speed synchronization inside the interlock switch element SK when changing the second to the third gear, if this, as can be seen in the representation of FIG. 1, is formed as a positive-fit switching element without synchronization. The electric motor can also be operated both in a generator-driven manner and also in a motor-operated manner in this mode.

The further states E1, E2 and E3 are then electrical pathways that are realized when the separating clutch K0 is opened in the case of E1 with an inserted switching element SA and SB. When changing E1 to E2, the switching element SB is opened and the planetary gear set 8 is blocked, when further changing into E3, the switching element SA is then opened and the switching element SB is correspondingly closed.

As already mentioned, both described embodiment variations of the hybrid drive system according to the invention can have a "neutral" position, wherein the countershaft and therefore the output is decoupled via the output gear 15. Therefore, both switching elements SA and SB are operated in the representation of FIG. 2 such that their respective sliding sleeves 18A and 18B can only be connected with one of the idle gears LA, LB or, as it can be seen in the representation of FIG. 2, with the common synchronization body 17, but not with the respective idle gear LA, LB. In the representation of FIG. 1, this neutral position can be achieved by the sliding sleeve 18 being correspondingly moved, for example in the direction of the idle gear LA, so that it is still only connected with this, for which purpose, in the representation of FIG. 1, the idle gear LA is formed with a corresponding projection around the countershaft 12, in order to also graphically suggest the creation of the necessary installation space here.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A hybrid drive system, comprising:
an internal combustion engine;
an electric motor;
a first spur gear component transmission and a second spur gear component transmission, wherein the first and second spur gear components drive at least one countershaft; and
a planetary gear set arranged coaxially to a crankshaft of the internal combustion engine, wherein the planetary gear set includes a first shaft, a second shaft, a third shaft, and a fourth shaft,
wherein the first shaft of the planetary gear set is coupled or couplable with the crankshaft of the internal combustion engine such that torsional moments originating from the internal combustion engine are introducible into the planetary gear set via the first shaft of the planetary gear set,
wherein a rotor of the electric motor is coupled or couplable with the second shaft of the planetary gear set such that torsional moments originating from the rotor are introducible into the planetary gear set via the second shaft of the planetary gear set, wherein a first input shaft of the first spur gear component transmission is connected in a manner fixed against rotation with the third shaft of the planetary gear set,
wherein a second input shaft of the second spur gear component transmission is connected in a manner fixed against rotation with the fourth shaft of the planetary gear set,
wherein the first and second spur gear component transmissions each have exactly one spur gear pairing,
wherein an interlock switch element, which is configured to establish the rotationally fixed connection of the third and fourth shafts of the planetary gear set, is arranged between the exactly one gear pairing of the first and second spur gear component transmissions in an axial direction, seen relative to an axis of rotation of the input shafts, and
wherein the at least one countershaft is exactly one countershaft, which has an output gear connected to the exactly one countershaft in a manner fixed against rotation, wherein the output gear is arranged overlapping the planetary gear set relative to the axial direction.

2. The hybrid drive system of claim 1, wherein relative to torsional movement power of the internal combustion engine originating from the internal combustion engine, the planetary gear set and the first and second spur gear component transmissions are arranged one after the other in the recited order.

3. The hybrid drive system of claim 1, wherein the interlock switch element is a positive-fit coupling.

4. The hybrid drive system of claim 1, further comprising:
a separating clutch, wherein the crankshaft of the internal combustion engine is connectable with the first shaft of the planetary gear set via the separating clutch in a manner fixed against rotation.

5. The hybrid drive system of claim 1, wherein the electric motor or a rotor gear is connected with the rotor of the electric motor in a manner fixed against rotation and is arranged overlapping the planetary gear set as seen in the axial direction.

6. The hybrid drive system of claim 1, wherein the electric motor is connected with the second shaft of the planetary gear set via further gear elements.

7. The hybrid drive system of claim 1, further comprising:
a first switching element arranged coaxially to the at least one countershaft and between the exactly one spur gear pairing of the first and second spur gear component transmissions in the axial direction.

8. The hybrid drive system of claim 7, further comprising:
a second switching element arranged coaxially to the at least one countershaft and between the exactly one spur gear pairing of the first and second spur gear component transmissions in the axial direction.

9. The hybrid drive system of claim 8, wherein the first and second switching elements have a common synchronization body.

10. The hybrid drive system of claim 9, wherein the first and second switching elements have a common sliding sleeve.

11. The hybrid drive system of claim 1, wherein the first shaft of the planetary gear set is formed by a first sun, the second shaft of the planetary gear set is formed by a ring gear, the third shaft of the planetary gear set is formed by a second sun, and the fourth shaft of the planetary gear set is formed by a bridge of the planetary gear set.

12. The hybrid drive system of claim 1, wherein the first shaft of the planetary gear set is formed by a ring gear, the second shaft of the planetary gear set is formed by a second sun, the third shaft of the planetary gear set is formed by a bridge, and the fourth shaft of the planetary gear set is formed by a first sun of the planetary gear set.

\* \* \* \* \*